United States Patent
Kumar et al.

(10) Patent No.: US 11,606,273 B1
(45) Date of Patent: Mar. 14, 2023

(54) MONITORING SERVER PERFORMANCE USING SERVER PROCESSING TIME

(71) Applicant: Juniper Networks, Inc., Sunnyvale, CA (US)

(72) Inventors: Rajneesh Kumar, Bangalore (IN); Unni Dilip, Bangalore (IN); Vijay Sai Ram Paruchuri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/303,220

(22) Filed: May 24, 2021

(51) Int. Cl.
  H04L 43/0817 (2022.01)
  H04L 43/087 (2022.01)
  H04L 43/067 (2022.01)
  H04L 43/106 (2022.01)

(52) U.S. Cl.
  CPC ........ H04L 43/0817 (2013.01); H04L 43/067 (2013.01); H04L 43/087 (2013.01); H04L 43/106 (2013.01)

(58) Field of Classification Search
  CPC . H04L 43/0817; H04L 43/067; H04L 43/106; H04L 43/087
  See application file for complete search history.

(56) References Cited

U.S. PATENT DOCUMENTS

| | | | |
|---|---|---|---|
| 6,446,028 B1 * | 9/2002 | Wang | ...................... H04L 43/00 702/186 |
| 7,912,978 B2 | 3/2011 | Swildens et al. | |
| 7,962,582 B2 | 6/2011 | Potti et al. | |
| 8,665,724 B2 | 3/2014 | Stanwood et al. | |
| 9,369,520 B2 | 6/2016 | Luecke et al. | |
| 9,912,788 B2 | 3/2018 | Mahkonen et al. | |
| 9,979,674 B1 * | 5/2018 | Kumar | ..................... H04L 43/16 |
| 10,541,900 B2 | 1/2020 | Sadana et al. | |
| 10,666,514 B2 | 5/2020 | Burke et al. | |
| 10,805,341 B2 | 10/2020 | Anderson et al. | |
| 2002/0057686 A1 * | 5/2002 | Leon | ..................... H04N 21/658 370/389 |
| 2003/0221000 A1 | 11/2003 | Cherkasova et al. | |

(Continued)

FOREIGN PATENT DOCUMENTS

WO 2013184846 A1 12/2013

OTHER PUBLICATIONS

Fielding et al., "Hypertext Transfer Protocol—HTTP/1.1," Network Working Group, RFC 2616, Jun. 1999, 176 pp.

*Primary Examiner* — John A Follansbee
*Assistant Examiner* — Kamal M Hossain
(74) *Attorney, Agent, or Firm* — Shumaker & Sieffert, P.A.

(57) ABSTRACT

A network device includes a memory and one or more processors in communication with the memory. The one or more processors are configured to configure a proxy server to forward a request for data from a client device to a data server and to forward, from the data server to the client device, a response message that is responsive to the request for data. The one or more processors are further configured to receive an indication of a set of header fields for the response message that indicates a first time specifying when the data server received the request for data and a second time specifying when the response message was sent by the data server and generate a metric for a performance of the data server based on the first time and the second time.

16 Claims, 8 Drawing Sheets

(56) References Cited

U.S. PATENT DOCUMENTS

| | | | |
|---|---|---|---|
| 2006/0221837 A1* | 10/2006 | Gardner | H04L 65/80 370/241 |
| 2008/0002678 A1 | 1/2008 | Kiessig et al. | |
| 2014/0067996 A1* | 3/2014 | Zhang | H04L 63/0428 709/227 |
| 2016/0119214 A1* | 4/2016 | Luo | H04L 43/106 370/253 |
| 2016/0366022 A1* | 12/2016 | Finkelstein | H04L 43/0864 |
| 2017/0093674 A1* | 3/2017 | Lacher | H04L 43/087 |
| 2017/0207988 A1* | 7/2017 | Li | H04L 41/5087 |
| 2020/0195557 A1* | 6/2020 | Duan | H04L 45/04 |
| 2020/0336926 A1* | 10/2020 | Cui | H04L 43/10 |
| 2020/0403890 A1* | 12/2020 | McCulley | H04L 43/04 |
| 2021/0006589 A1 | 1/2021 | Kohout et al. | |
| 2021/0195384 A1* | 6/2021 | Spirkó | H04L 63/1408 |

\* cited by examiner

MONITORING SERVER PERFORMANCE USING SERVER PROCESSING TIME

TECHNICAL FIELD

The disclosure relates to computer networks.

BACKGROUND

The Internet has grown since its inception to a worldwide pervasive network that services more than a billion users. Today, individual subscribers are not limited to running a few network sessions with voice and/or data downloads over the network. Instead, the extent of services used by subscribers varies widely, including multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for detection of service level agreement (SLA) metrics for software as a service (SaaS), such as hypertext transfer protocol (HTTP) based application services. For example, a controller, such as a Software-Defined Networking (SDN) controller that implements the techniques described herein, may configure a proxy server (e.g., a secure sockets layer (SSL) proxy server) to forward a request (e.g., an HTTP GET request) from a client device to a data server (e.g., an HTTP server) and to forward a response message (e.g., an HTTP response message) from the data server to the client device. In this example, the controller may receive an indication of a set of header fields (e.g., HTTP headers) for the response message that indicates a first time specifying when the data server received the request for data and a second time specifying when the response message was sent by the data server. The controller may generate a metric for the performance of the data server based on the first time and the second time. For instance, the controller may determine one or more of a server processing time, a round-trip time (RTT), or a jitter (e.g., a forward jitter or a reverse jitter).

In one example, a method includes configuring, by one or more processors, a proxy server to forward a request for data from a client device to a data server and to forward, from the data server to the client device, a response message that is responsive to the request for data. The method further includes receiving, by the one or more processors, an indication of a set of header fields for the response message that indicates a first time specifying when the data server received the request for data and a second time specifying when the response message was sent by the data server and generating, by the one or more processors, a metric for a performance of the data server based on the first time and the second time.

In another example, a network device includes a memory and one or more processors in communication with the memory. The one or more processors are configured to configure a proxy server to forward a request for data from a client device to a data server and to forward, from the data server to the client device, a response message that is responsive to the request for data. The one or more processors are further configured to receive an indication of a set of header fields for the response message that indicates a first time specifying when the data server received the request for data and a second time specifying when the response message was sent by the data server and generate a metric for a performance of the data server based on the first time and the second time.

In one example, a computer-readable medium comprising instructions for causing one or more processors to configure a proxy server to forward a request for data from a client device to a data server and to forward, from the data server to the client device, a response message that is responsive to the request for data. The instructions further cause the one or more processors to receive an indication of a set of header fields for the response message that indicates a first time specifying when the data server received the request for data and a second time specifying when the response message was sent by the data server and generate a metric for a performance of the data server based on the first time and the second time.

The details of one or more examples are set forth in the accompanying drawings and the description below. Other features, objects, and advantages will be apparent from the description and drawings, and from the claims.

DETAILED DESCRIPTION

In general, the disclosure describes techniques for a detection of service level agreement (SLA) metrics for software as a service (SaaS), such as hypertext transfer protocol (HTTP) based application servers. Techniques described herein may refer to a secure sockets layer (SSL) proxy server and an HTTP server, however, techniques may apply to any type of proxy device and/or data server.

In some systems, a client device may generate an HTTP get request for data and output the HTTP get request to a SSL proxy server. The SSL proxy server may be configured to establish a set of encrypted links between the proxy server and the HTTP server and to forward the HTTP get request to the HTTP server using the set of encrypted links. The HTTP server may generate a response message that includes a payload for data requested in the HTTP get request and outputs the response message to the SSL proxy server using the set of encrypted links. The HTTP server may include a timestamp indicating when the response message was sent by the HTTP server. A controller may measure a metric (e.g., a packet latency) using the timestamp indicating when the response message was sent by the HTTP server.

Because the SSL proxy processes the HTTP get request and the response message separately, the SSL proxy may not correlate time information for the HTTP get request and the response message. As such, systems may not calculate metrics using a time, for example, when the HTTP get request is sent to the SSL proxy. Additionally, the HTTP server may use a timestamp that indicates when the HTTP server outputs the response message and may not have a header field to include time information to indicate when the HTTP server receives the HTTP get requests. Accordingly, time information to indicate when the HTTP server receives the HTTP get requests may be "lost" to the system and, thus, such systems may not be able to calculate metrics using a time when the HTTP server receives the HTTP get requests. That is, for HTTP requests and response(s), there may be no way to know the time skew for each packet. For different SaaS servers, service level agreement (SLA) metrics may be different which may be further evaluated. In some examples, actual traffic may be bursty and/or random, which may prevent proper SLA evaluation. Accordingly, such systems may not be able to calculate metrics to verify a SLA, particularly, metrics to verify a SLA provided by an HTTP server.

In accordance with the techniques of the disclosure, a controller such as a Software-Defined Networking (SDN) controller that implements the techniques described herein may configure a proxy server to forward a request (e.g., an HTTP get request) from a client device to a data server (e.g., an HTTP server) and to forward a response message (e.g., an HTTP response message) from the data server to the client device. In this example, the controller may receive an indication of a set of header fields (e.g., HTTP headers) for the response message that indicates a first time (e.g., a receive-date) specifying when the data server received the request for data and a second time specifying when the response message was sent by the data server. In this way, the controller may receive the timestamp of packets received and responses sent from the server. In some examples, the controller may match request and responses, for example, using opaque user data included in fields of both the request and the response(s). Such timestamps of packets may help to enable the controller to determine one or more of RTT, jitter, out-of-order detection, and/or simulation of burst traffic.

The controller may generate a metric for the performance of the data server and/or a metric for connectivity between the proxy to the data server based on the first time and the second time. For instance, the controller may determine one or more of a server processing time, a round-trip time (RTT), or a jitter (e.g., a forward jitter or a reverse jitter). In this way, a performance of the data server may be verified, which may improve a reliability and operation of the data server because errors may be more quickly identified compared to system that do not determine a metric based on the first time specifying when the data server received the request for data and the second time specifying when the response message was sent by the data server.

In some examples, when the controller determines that a server processing time for data server does not satisfy a SLA, the controller may select another data server. The controller may also determine a performance of a link for the data server. For example, the controller may determine one or more of an incoming link time for transmitting data from a proxy to the data server or an outgoing link time for transmitting data from the data server to the proxy. In this way, the controller may load balance a plurality of data servers, which may improve a performance of the plurality of data servers compared to systems that do not calculate a server processing time or determine the performance of the link for the data server.

Figure 1:
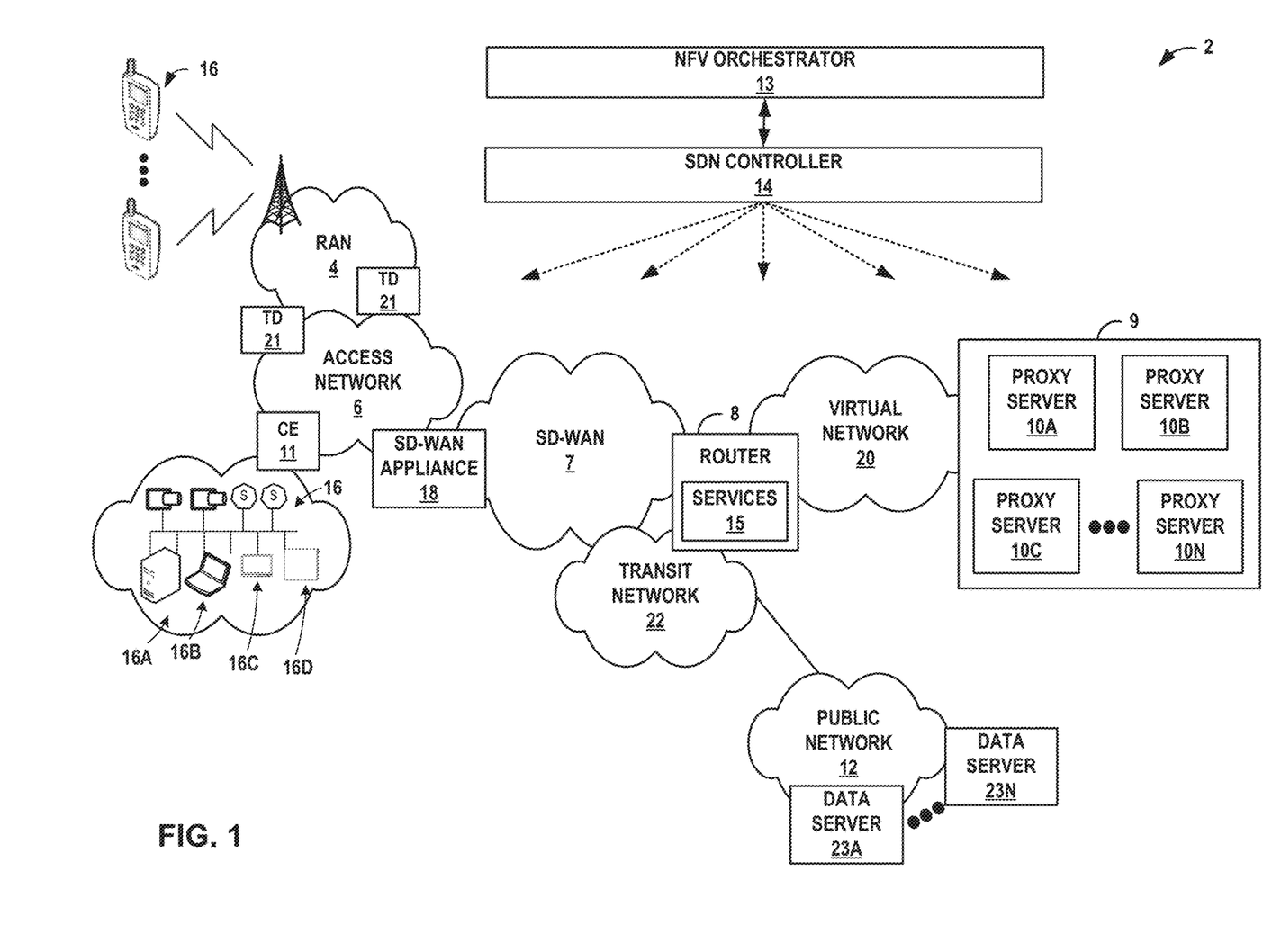
FIG. 1 is a block diagram illustrating an example software-defined wide area network system that performs server monitoring techniques, in accordance with the techniques of this disclosure.

FIG. 1 is a block diagram illustrating an example software-defined wide area network system 2 that performs edge-based routing techniques, in accordance with the examples described herein. The example network system of FIG. 1 includes a SD-WAN system 2 that operates as a private network to provide packet-based network services to client devices 16. That is, SD-WAN system 2 provides authentication and establishment of network access for client devices 16 such that a subscriber device may begin exchanging data packets with public network 12, which may be an internal or external packet-based network such as the Internet.

In the example of FIG. 1, SD-WAN system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by client devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, client devices 16 connect to gateway router 8 via access network 6 to receive connectivity to subscriber services for applications hosted by public network 12 or router 9. A subscriber may represent, for instance, an enterprise, a residential subscriber, or a mobile subscriber. Client devices 16 may be, for example, personal computers, laptop computers or other types of computing devices positioned behind customer equipment (CE) 11, which may provide local routing and switching functions. Each of client devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, client devices 16 may comprise mobile devices that access the data services of SD-WAN system 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between client devices 16 and router 8. Access network 6 represents a network that aggregates data traffic from one or more of client devices 16 for transport to/from SD-WAN 7 of the service provider. Access network 6 includes network nodes that execute communication protocols to transport control and user data to facilitate communication between client devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to client devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with proxy servers 10 via virtual network 20, and router 8 may forward packets to public network 12 via transit network 22.

In examples of SD-WAN system 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of SD-WAN system 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component.

A network service provider that administers at least parts of SD-WAN system 2 typically offers services to subscribers associated with devices, e.g., client devices 16, that access SD-WAN system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include client devices 16 that attach to multiple different access networks 6 having varying architectures.

In general, any one or more of client devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of client devices 16 requesting network access. Once authenticated, any of client devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on proxy servers 10. Applications (e.g., service applications) to be applied to the subscriber traffic may be hosted on proxy servers 10.

In the example of FIG. 1, SD-WAN system 2 comprises a software defined network (SDN) and network functions virtualization (NFV) architecture. SDN controller device 14 may provide a high-level controller for configuring and managing the routing and switching infrastructure of SD-WAN system 2. While some instances described herein relate to SD-WAN appliance 18 performing the edge-based routing techniques described herein, SDN controller 14 may also perform these techniques for SD-WAN system 2. NFV orchestrator device 13 may provide a high-level orchestrator for configuring and managing virtualization of network services into proxy servers 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by proxy servers 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, proxy servers 10 may be network devices coupled by one or more switches or virtual switches of SD-WAN 7. For example, each of proxy servers 10 may run as VMs in a virtual compute environment. Moreover, the compute environment may comprise a scalable cluster of general computing devices, such as x86 processor-based servers. In some examples, proxy servers 10 may comprise a combination of general purpose computing devices and special purpose appliances. As virtualized network services, individual network services provided by proxy servers 10 can scale just as in a modern data center through the allocation of virtualized memory, processor utilization, storage and network policies, as well as horizontally by adding additional load-balanced VMs. In other examples, proxy servers 10 may be gateway devices or other routers. In further examples, the functionality described with respect to each of proxy servers 10 may be implemented in a switch, service card, or another network element or component. Each one of proxy servers 10 may comprise a data server. In some examples, one or more of proxy servers 10 may comprise a secure sockets layer (SSL) proxy server or a transport layer security (TLS) proxy server. For example, proxy servers 10 may be configured to use CONNECT with HTTP in accordance to Fielding et al., "Hypertext Transfer Protocol-HTTP/1.1", Network Working Group, RFC 2616 (hereinafter, RFC 2616), which is incorporated herein by reference.

Data servers 23A-23N (collectively, "data servers 23") are configured to provide data in response to requests for data. In some examples, data servers 23 may comprise one or more HTTP servers compliant with HTTP and configured to process HTTP get messages. Data servers 23 may be configured to use a set of HTTP header fields compliant with HTTP. For example, data servers 23 may be configured to use a set of header fields (e.g., HTTP headers) for the response message that indicate a first time (e.g., a receive-date) specifying when the data server received the request for data and a second time specifying when the response message was sent by the data server. For example, data servers 23 may be configured to use an HTTP get message in accordance to RFC 2616.

SDN controller 14 may use the set of header fields as described herein to determine one-way and two-way network performance measurements. For example, SDN controller 14 may determine one or more of a keepalive or path connectivity, round trip time (RTT), path delay, packet jitter, packet re-ordering, packet loss, service latency measurements, or service load measurements based on the received header fields.

In accordance with the techniques of the disclosure, SDN controller 14 may configure proxy server 10A to forward a request for data from client device 16A to data server 23A and to forward, from data server 23A to client device 16A, a response message that is responsive to the request for data. In this example, SDN controller 14 may receive an indication of a set of header fields for the response message that indicates a first time specifying when data server 23A received the request for data and a second time specifying when the response message was sent by data server 23A. For instance, SDN controller 14 may receive the an indication of a set of header fields from proxy servers 10. SDN controller 14 may generate a metric (e.g., a server processing time) for the performance of data server 23A based on the first time and the second time. For instance, SDN controller 14 may determine one or more of a server processing time, a round-trip time (RTT), or a jitter (e.g., a forward jitter or a reverse jitter). In this way, a performance of data server 23A may be verified, which may improve a reliability and operation of data server 23A and, thus network 2, because errors may be more quickly identified compared to systems that do not determine a metric based on the first time specifying when data server 23A received the request for data and the second time specifying when the response message was sent by data server 23A.

In some examples, when SDN controller 14 determines that a server processing time for data server 23A does not satisfy a SLA, SDN controller 14 may select another data server (e.g., data server 23N). In this way, SDN controller 14 may load balance data servers 23, which may improve a performance of data servers 23 compared to systems that do not calculate a server processing time.

Figure 2:
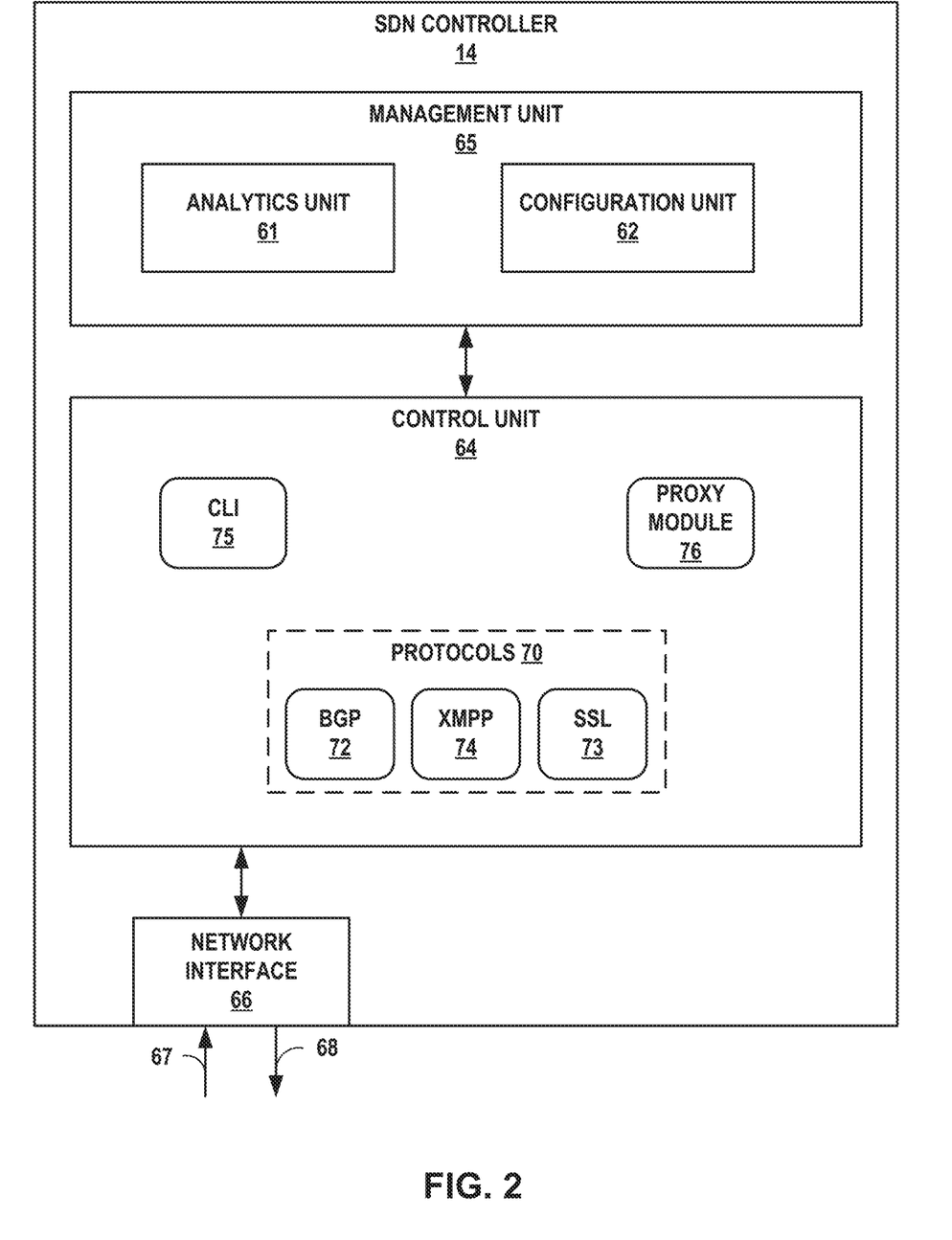
FIG. 2 is a block diagram illustrating an example software-defined wide area network controller configured to execute one or more functions to perform server monitoring techniques, in accordance with the techniques of this disclosure.

FIG. 2 is a block diagram illustrating the example SDN controller 14 of FIG. 1 configured to implement the techniques described herein. In the example of FIG. 2, SDN controller 14 may configure proxy server 10A to forward a request for data from client device 16A to data server 23A and to forward, from data server 23A to client device 16A, a response message that is responsive to the request for data. In the illustrated example of FIG. 2, SDN controller 14 includes a management unit 65, a control unit 64 for controlling operation of SDN controller 14, and a network interface 66 for exchanging packets with network devices by inbound link 67 and outbound link 68.

In some examples, control unit 64 and/or management unit 65 may be implemented as one or more processes executing on one or more virtual machines of one or more physical computing devices. That is, while generally illustrated and described as executing on a single SDN controller 14, aspects of each of these units may be delegated to or distributed across other computing devices.

Each of control unit 64 and/or management unit 65 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively, or additionally, each of control unit 64 and/or management unit 65 may comprise dedicated hardware, such as one or more integrated circuits, one or more application-specific integrated circuits (ASICs), one or more Application Specific Special Processors (ASSPs), one or more FPGAs, or any combination of one or more of the foregoing examples of dedicated hardware, for performing the techniques described herein. The architecture of SDN controller 14 illustrated in FIG. 2 is shown for example purposes only and should not be limited to this architecture. In other examples, SDN controller 14 may be implemented in a variety of ways, such software only, hardware only, or a combination of both software and hardware.

Management unit 65 may comprise a management layer of SDN controller 14, whereas control unit 64 may comprise a control layer of SDN controller 14. Management unit 65 includes an analytics unit 61 and a configuration unit 62. Analytics unit 61 may capture information from physical and/or virtual network elements within SD-WAN system 2, e.g., a gateway, proxy servers 10, or of each data center 9 of FIG. 1, and analyze the information for use in managing the network services offered by the service provider. The information may include statistics, logs, events, and errors.

Configuration unit 62 stores configuration information for the network elements within SD-WAN system 2. In some examples, the configuration information comprises a virtual network configuration. Configuration unit 62 may translate a high-level data model of the intended virtual network configuration to a lower-level data model for use in interacting with the network elements.

Control unit 64 of SDN controller 14 implements a centralized control plane for SD-WAN system 2 that is responsible for maintaining a constantly changing network state. Control unit 64 interacts with the network elements within SD-WAN system 2 to maintain a consistent network state across all of the network elements. Control unit 64 provides an operating environment for a command line interface daemon 75 ("CLI 75") that provides an interface by which an administrator or other management entity may modify the configuration of SDN controller 14 using text-based commands. Control unit 64 also provides an operating environment for several protocols 70, including Border Gateway Protocol (BGP) 72, Extensible Messaging and Presence Protocol (XMPP) 74, and SSL 73 as illustrated in the example of FIG. 2.

In some examples, control unit 64 uses XMPP 74 to communicate with network elements within SD-WAN system 2, such as gateways 8, client devices 16, or proxy servers 10 of data center 9, by an XMPP interface (not shown). Virtual network route data, statistics collection, logs, and configuration information may be sent as extensible markup language (XML) documents in accordance with XMPP 74 for communication between SDN controller 14 and the network elements. Control unit 64 may also use XMPP 74 to communicate with one or both of analytics unit 61 and configuration unit 62 of SDN controller 14. SSL 73 may be configured to provides encryption technology. SSL 73 may be configured for transport layer security (TLS). SSL 73 may help to ensure a secure transmission of data between client devices 16 and data servers 23 through a combination of privacy, authentication, confidentiality, and data integrity. SSL 73 may use certificates and/or private-public key exchange pairs.

Control unit 64 further includes proxy module 76. Proxy module 76 may configure proxy server 10A to forward a request for data from client device 16A to data server 23A and to forward, from data server 23A to client device 16A, a response message that is responsive to the request for data. Proxy module 76 may configure the proxy server to establish a set of encrypted links between proxy server 10A and data server 23A. In this example, to forward the request for data, proxy server 10A may be configured to forward the request for data using the set of encrypted links and, to forward the response message, proxy server 10A is configured to receive the response message using the set of encrypted links.

In some examples, proxy module 76 may select a data server of data servers 23 based on metric. SDN controller 14 may generate the metric using a set of header fields for the response message. For example, SDN controller 14 may generate the metric based on a first time of the set of header fields of the response message that specifies when data server 23A received the request for data and a second time of the set of header fields of the response message that specifies when the response message was sent by data server 23A. In this example, proxy module 76 may select one of data servers 23 based on the metric. For example, proxy module 76 may perform load balancing to minimize a server processing time for data servers 23 based on the metric. While the example described here refers to client device 16A and data server 23A other client devices and/or data servers may be used.

Figure 3:
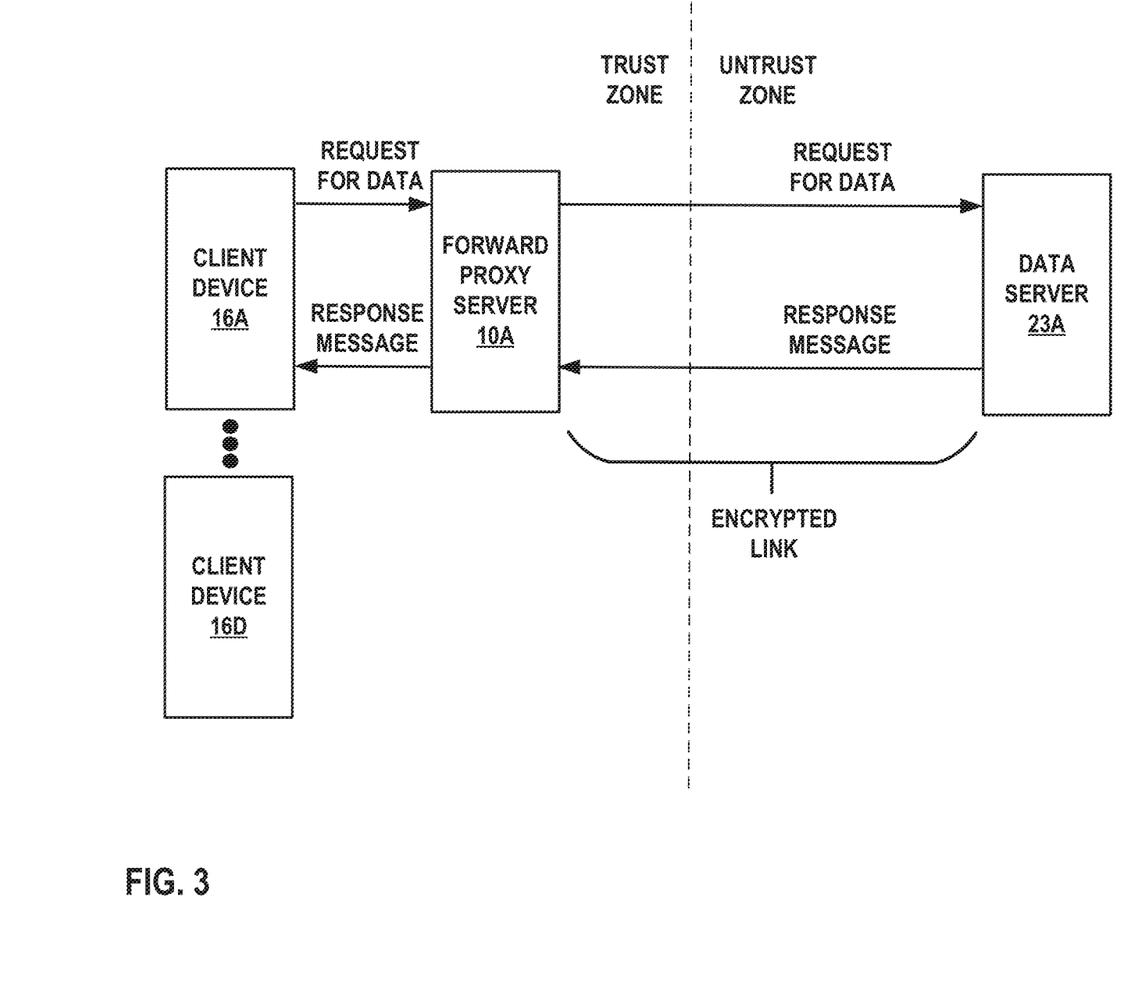
FIG. 3 is a block diagram illustrating an example forward proxy, in accordance with the techniques of this disclosure.

FIG. 3 is a block diagram illustrating an example forward proxy, in accordance with the techniques of this disclosure. In this example, proxy server 10A is configured as a forward proxy. For example, proxy server 10A may reside between client device 16A and data server 23A (e.g., outside a "trust zone" for data server 23A). Proxy server 10A may "proxy" an outbound session, that is, locally initiated SSL session to the Internet. Proxy server 10A may decrypt and inspect traffic from internal users to the web, for example, using HTTP. In this example, forward proxy server 10A may forward a request for data for each of client devices 16A-16D.

Forward proxy server 10A may be configured to copy header information from the request for data sent by client device 16A and received by forward proxy server 10A into the request for data output to data server 23A. Similarly, forward proxy server 10A may be configured to copy header information from the response message output to data server 23A to the response message output by the forward proxy server 10A to client device 16A. In some examples, forward proxy server 10A may be configured to forward an indication of one or more of a RTT, a time for when the client device 16A output the request for data, or a time for then the data server 23A output the response message.

Figure 4:
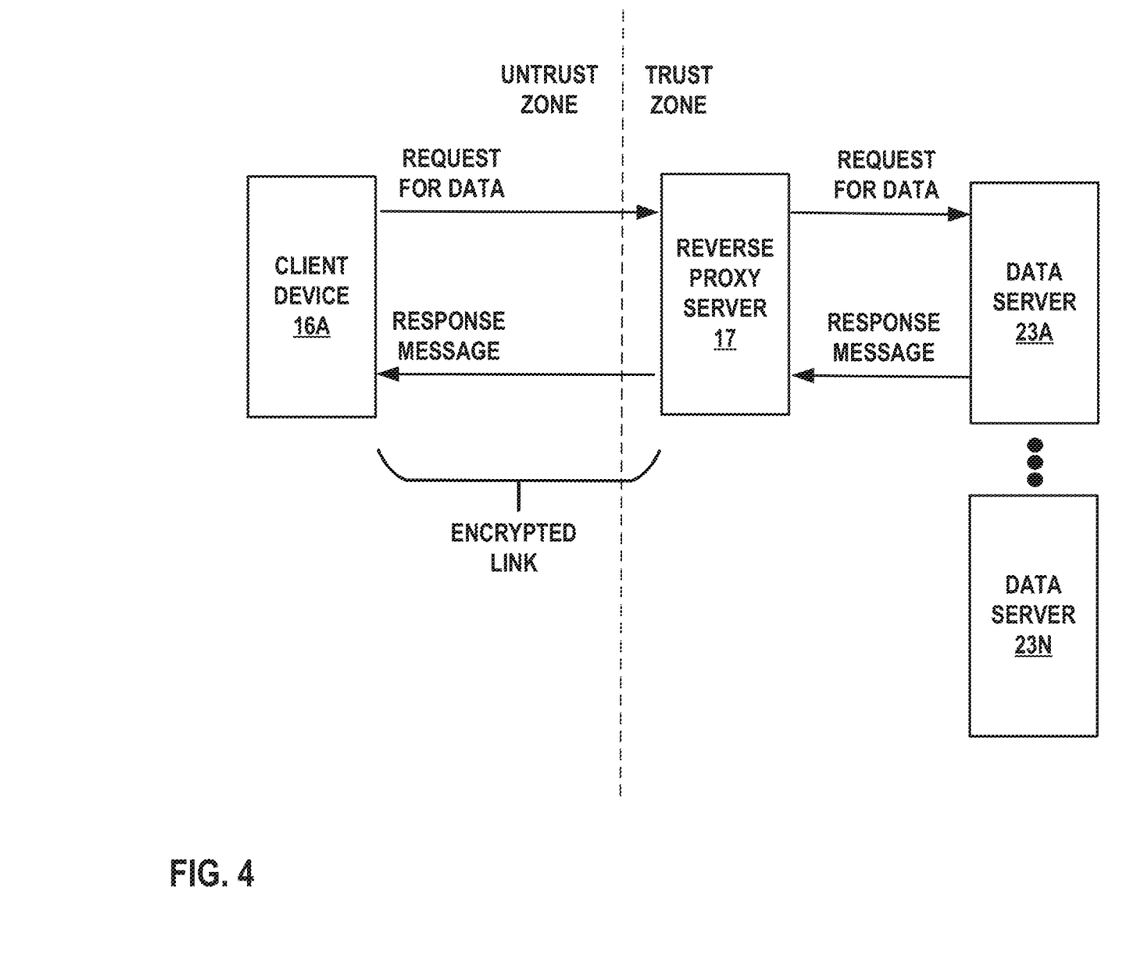
FIG. 4 is a block diagram illustrating an example reverse proxy, in accordance with the techniques of this disclosure.

FIG. 4 is a block diagram illustrating an example reverse proxy, in accordance with the techniques of this disclosure. In this example, proxy server 17 is configured as a reverse proxy. Proxy server 17 may reside between data server 23A and client device 16A. Proxy server may proxy an inbound session, that is, externally initiated SSL sessions from the Internet to the data servers 23. In this example, reverse proxy server 17 may forward a request for data to any one of data servers 23. In some examples, SDN controller 14 may configure reverse proxy server 17 to forward to a selected data server of data servers 23 based on one or more metrics (e.g., a server processing time) determined using one or more techniques described herein.

Reverse proxy server 17 may be configured to copy header information from the request for data sent by client device 16A and received by reverse proxy server 17 into the request for data output to data server 23A. Similarly, forward proxy server 17 may be configured to copy header information from the response message output to data server 23A to the response message output by the reverse proxy server 17 to client device 16A. In some examples, reverse proxy server 17 may be configured to forward an indication of one or more of a RTT, a time for when the client device 16A output the request for data, or a time for then the data server 23A output the response message.

Figure 5:
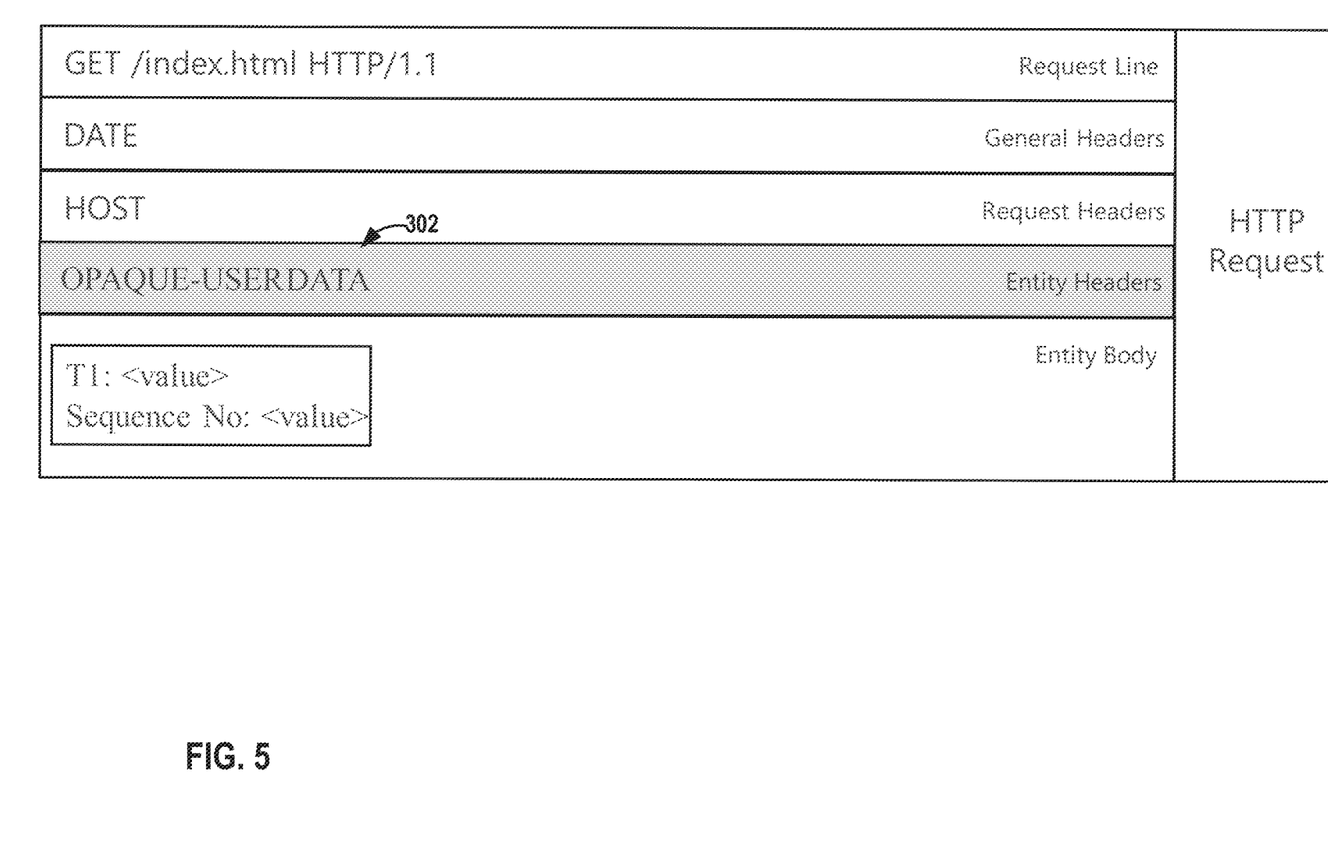
FIG. 5 is a block diagram illustrating an example request message format, in accordance with the techniques of this disclosure.

FIG. 5 is a block diagram illustrating an example request message format, in accordance with the techniques of this disclosure. As shown, the request message format of FIG. 5. includes OPAQUE-USERDATA 302. OPAQUE-USERDATA 302 may represent an example of matching data. OPAQUE-USERDATA 302 may comprise an optional header that can be sent along with http get/head message. This optional header may be "replayed" when the response is sent from a data server, which may help to match requests and responses and, thus, help calculating SLA.

Figure 6:
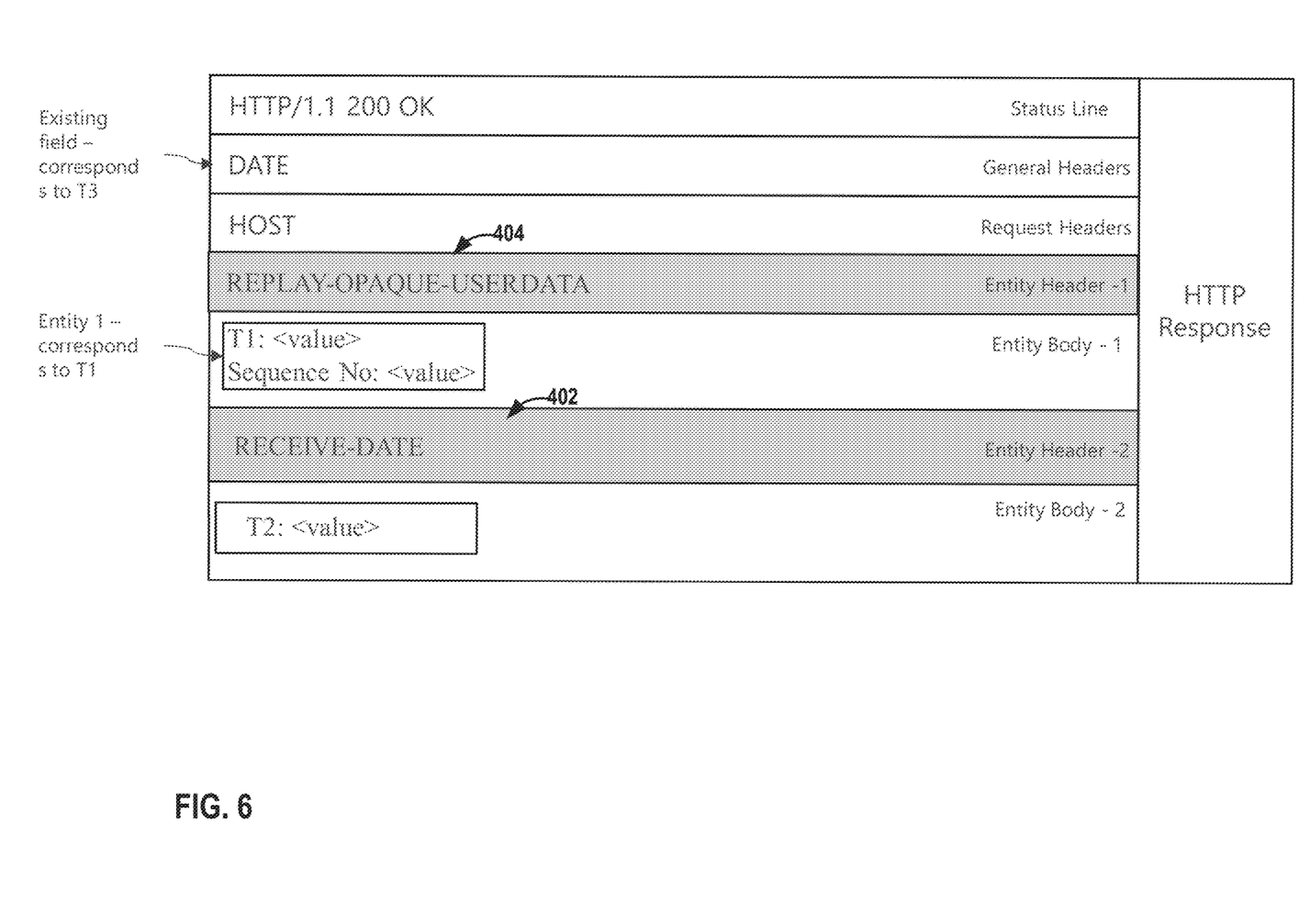
FIG. 6 is a block diagram illustrating an example response message format, in accordance with the techniques of this disclosure.

FIG. 6 is a block diagram illustrating an example response message format, in accordance with the techniques of this disclosure. As shown, the request message format of FIG. 6. includes RECEIVE-DATE 402 and REPLAY-OPAQUE-USERDATA 404.

RECEIVE-DATE 402 may indicate a receive time for a request message. RECEIVE-DATE 402 may represent an optional header field for providing a date and time at which the request was received for which a data server is responding now. RECEIVE-DATE 402 may only be sent when OPAQUE-USERDATA field 302 exists in the request message.

REPLAY-OPAQUE-USERDATA 404 may represent a header response message. REPLAY-OPAQUE-USERDATA 404 may be included in a response message if the request message has "OPAQUE-USERDATA" field. REPLAY-OPAQUE-USERDATA 404 may indicate that the optional header is copied in the response message. REPLAY-OPAQUE-USERDATA 404 may comprise an indication of an initiating time (e.g., T1) specifying when the client device sent the request for data.

In accordance with the techniques of the disclosure, SDN controller 14 or proxy devices 10 may add matching data (e.g., a sequence number) to provide the capability to match a request and a response. For example, SDN controller 14 or proxy devices 10 may determine matching data of the set of header fields for the response message (e.g., REPLAY-OPAQUE-USERDATA 404) and identify the request message in response to determining that the that the matching data of the set of header fields for the response message corresponds (e.g., matches or is equal to) to matching data of the header fields of the request for data (e.g., OPAQUE-USERDATA 302).

Figure 7:
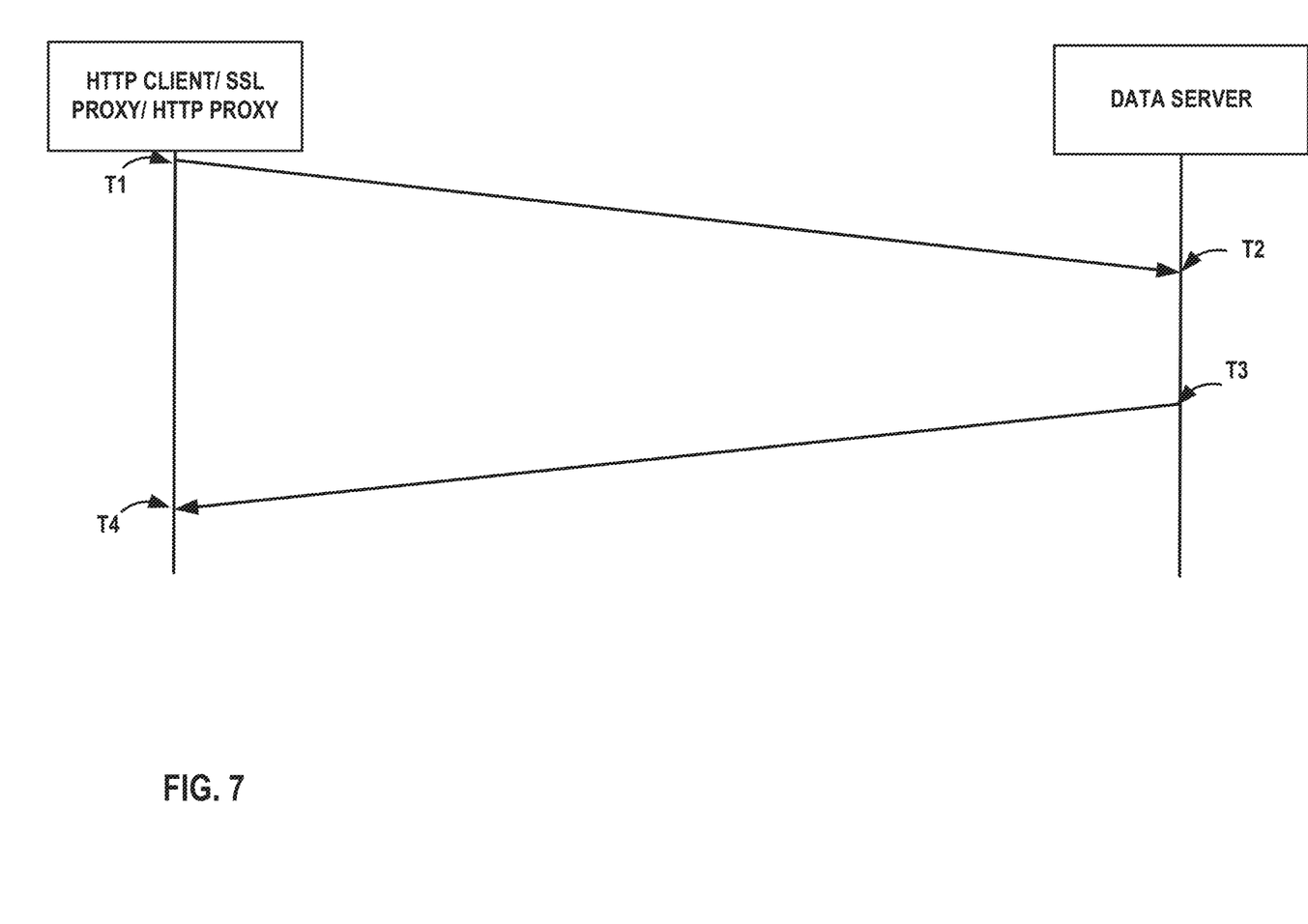
FIG. 7 is a conceptual diagram illustrating an example timing calculation diagram, in accordance with the techniques of this disclosure.

FIG. 7 is a conceptual diagram illustrating an example timing calculation diagram, in accordance with the techniques of this disclosure. SDN controller 14 or another controller may determine an initiating time (T1), a first time (T2), a second time (T3), and a data received time (T4) as shown in FIG. 7.

In this example, the initiating time (T1) may represent a time at which the request message sent from initiator value and may be sent in the extended header in the HTTP get request using OPAQUE-USERDATA 302. The initiating time (T1) may be sent back as part of REPLAY-OPAQUE-USERDATA 404 field in the response message.

The first time (T2) may represent a time at which the request message will be received at the data server (e.g., an HTTP server). The first time (T2) may be sent back in response message along with RECEIVE-DATE 402 field. The second time (T3) may represent a time when the response is sent by the data server (e.g., an HTTP server). The second time (T3) may be sent from the data server as part of DATE field. The data received time (T4) may represent a time when the response reaches the client device and may be obtained on the client device.

The SDN controller 14 or another controller may calculate SLA metrics using all these 4 timestamp values (e.g., T1, T2, T3, and T4). For example, SDN controller 14 may calculate a server processing delay. For instance, SDN controller 14 may calculate the RTT as follows.

Currently the RTT=travel time(tcp round trip time)+
server processing time.

SDN controller 14 may calculate the request processing delay on the data server, which may be obtained by calculating T3 minus T2. That is, SDN controller 14 may generate a server processing time for the data server based on a difference between the first time (i.e., T2) and the second time (i.e., T3). The processing delay may be an indicator for data server (e.g., an HTTP server) performance and/or a loading of the data server. In some examples, processing delay may be used for server load balancing of data servers.

SDN controller 14 may perform burst probing based on one or more of the initiating time (T1), the first time (T2), the second time (T3), and the data received time (T4). In some examples, HTTP request-response cannot be correlated without using techniques described herein for determining the initiating time (T1), the first time (T2), the second time (T3), and the data received time (T4).

SDN controller 14 may generate a forward jitter value based on the initiating time (i.e., T1) and the first time (i.e., T2). For example, SDN controller 14 may generate a forward jitter as follows.

$$|(T22-T21)-(T12-T11)|$$

Where T11 is a sending timestamp for $1^{st}$ packet at client, T21 receiving timestamp for $1^{st}$ packet on server, T12 is a sending timestamp for 2nd packet at client, T22 receiving timestamps for the $2^{nd}$ packet on server.

That is, SDN controller 14 may calculate a difference between the initiating time (i.e., T11) and a third time (i.e., T12) specifying when the client device sent a second request for data and calculate a difference between the first time (i.e., T21) and a fourth time (i.e., T22) specifying when the data server received the request for data SDN controller 14 may receive an indication of a data received time (i.e., T41) specifying when client device 16A received the response message. In this example, SDN controller 14 may generate a metric for the performance of data server 23A is based on the data received time (i.e., T41).

SDN controller 14 may generate a reverse jitter value for data server 23A based on the data received time (i.e., T41) and the second time (i.e., T21).

SDN controller 14 may calculate a reverse jitter as follows.

$$|(T42-T41)-(T32-T31)|$$

Where T31 is transmission time for $1^{st}$ packet's response time from server, T41 is the $1^{st}$ packet's response received at client and T32 is transmission time for 2nd packet's response time from server, & T42 is the 2nd packet's response received at client.

That is, SDN controller 14 may calculate a difference between the data received time (i.e., T41) and a third time (i.e., T42) specifying when client device 16A received a second response message and calculate a difference between the second time (i.e., T31) and a fourth time (i.e., T32) specifying when the second response message was sent by the data server.

Figure 8:
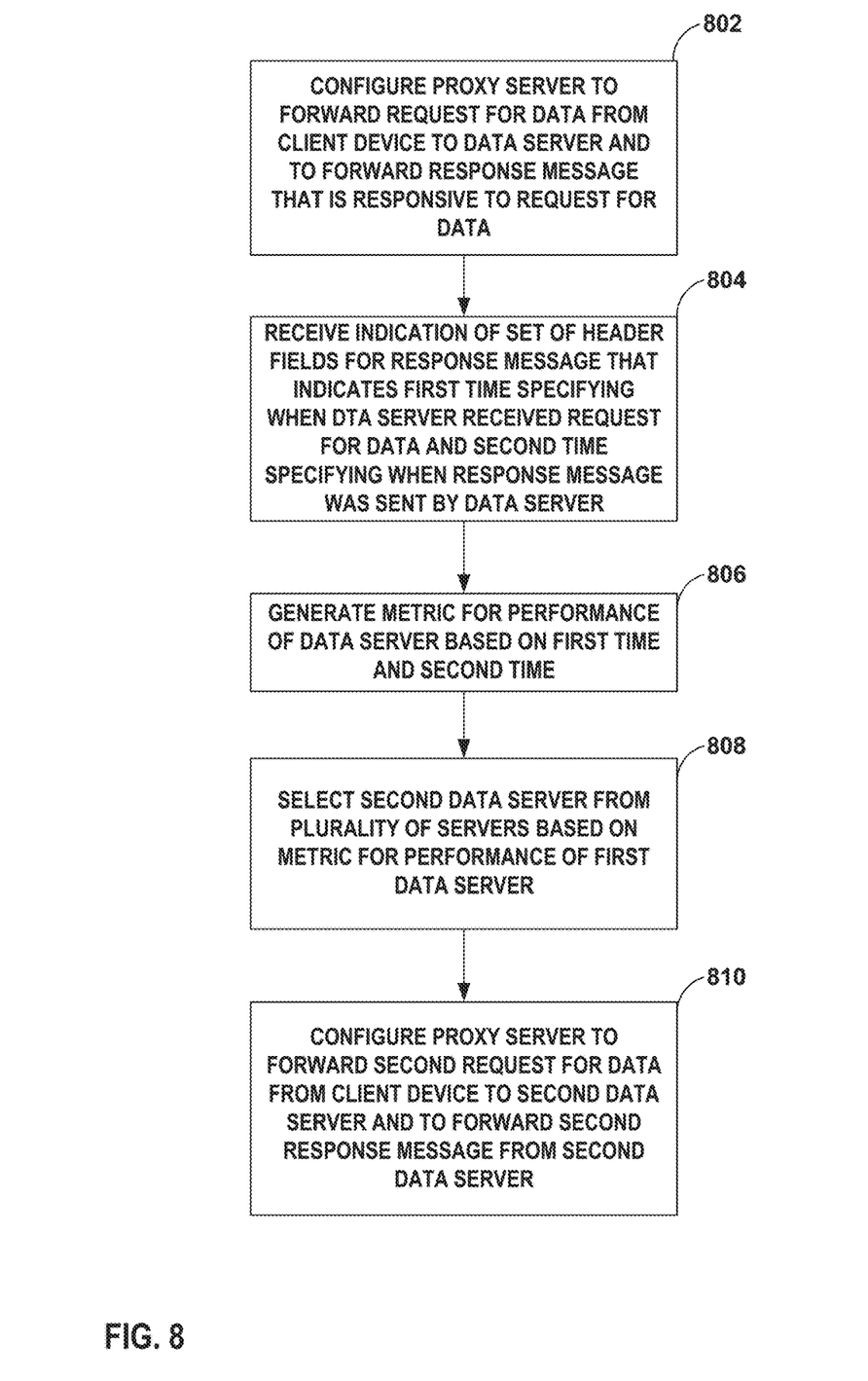
FIG. 8 is a flow diagram illustrating an example technique for a software-defined wide area network system that performs server monitoring, in accordance with the techniques of this disclosure.

FIG. 8 is a flow diagram illustrating an example technique for a software-defined wide area network system that performs server monitoring, in accordance with the techniques of this disclosure. The example operation may be performed by SDN controller 14 from FIG. 1, or SDN controller 14 of FIG. 3, for example. The following are steps of the process, although other examples of the process performed in the techniques of this disclosure may include additional steps or may not include some of the below-listed steps.

In accordance with the techniques described herein, SDN controller 14 may configure proxy server to forward a request for data from a client device to a data server and to forward, from the data server to the client device, a response message that is responsive to the request for data (802). For example, SDN controller 14 may configure proxy server 10A to forward a request for data from client device 10A to data server 23A and to forward, from data server 23A to client device 16A, a response message that is responsive to the request for data. SDN controller 14 may receive an indication of a set of header fields for the response message that indicates a first time specifying when the data server received the request for data and a second time specifying when the response message was sent by the data server (804). For example, SDN controller 14 may receive from proxy server 10A an indication of the HTTP header fields of the response message. SDN controller 14 may generate a metric for a performance of the data server based on the first time and the second time (806).

SDN controller 14 may select a second data server from a plurality of servers comprising the first data server based on the metric for the performance of the first data server (808). SDN controller 14 may configure the proxy server to forward a second request for data from the client device to the second data server and to forward, from the second data server to the client device, a second response message that is responsive to the first request for data (810).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
    configuring, by one or more processors of a Software-Defined Networking (SDN) controller, a proxy server to forward a request for data from a client device to a data server and to forward, from the data server to the client device, a response message that is responsive to the request for data, wherein a set of header fields of the request for data indicates matching data and wherein the data server is configured to copy the matching data indicated in the set of header fields of the request for data into a set of header fields for the response message;
    receiving, by the one or more processors, from the proxy server, an indication of the set of header fields for the response message that indicates a first time specifying when the data server received the request for data, a second time specifying when the response message was sent by the data server, and an indication of the matching data copied by the data server from the set of header fields of the request for data;
    identifying, by the one or more processors, that the response message is responsive to the request for data in response to determining that the matching data of the set of header fields for the response message matches the matching data of the header fields of the request for data; and
    in response to the identifying that the response message is responsive to the request for data, generating, by the one or more processors, a metric for a performance of the data server based on the first time and the second time, wherein generating the metric comprises generating, based on a difference between the first time indicated by the indication of the set of header fields received from the proxy server and the second time indicated by the indication of the set of header fields received from the proxy server, a server processing time for the data server to generate the response message to comprise a payload generated by the data server that is responsive to the request for data.

2. The method of claim 1, wherein the request is a first request, the data server is a first data server, and the response message is a first response message, the method further comprising:
    selecting, by the one or more processors, a second data server from a plurality of servers comprising the first data server based on the metric for the performance of the first data server; and
    configuring, by the one or more processors, the proxy server to forward a second request for data from the client device to the second data server and to forward, from the second data server to the client device, a second response message that is responsive to the first request for data.

3. The method of claim 1,
    wherein receiving the indication of the set of header fields for the response message comprises receiving an indication of an initiating time specifying when the client device sent the request for data; and
    wherein generating the metric for the performance of the data server is further based on the initiating time.

4. The method of claim 3, wherein generating the metric comprises generating a forward jitter value for the data server based on the initiating time and the first time.

5. The method of claim 4, wherein the request for data is a first request for data and the response message is a first response message and wherein generating the forward jitter value for the data server comprises:
    calculating a difference between the initiating time and third time specifying when the client device sent a second request for data and calculating a difference between the first time and a fourth time specifying when the data server received the request for data.

6. The method of claim 1, further comprising:
    receiving, from the client device, an indication of a data received time specifying when the client device received the response message; and
    wherein generating the metric for the performance of the data server is further based on the data received time.

7. The method of claim 6, wherein generating the metric comprises generating a reverse jitter value for the data server based on the data received time and the second time.

8. The method of claim 7, wherein the request for data is a first request for data and the response message is a first response message and wherein generating the reverse jitter value for the data server comprises:
calculating a difference between the data received time and a third time specifying when the client device received a second response message and calculating a difference between the second time and a fourth time specifying when the second response message was sent by the data server.

9. The method of claim 1,
wherein configuring the proxy server comprises configuring the proxy server to establish a set of encrypted links between the proxy server and the data server;
wherein, to forward the request for data, the proxy server is configured to forward the request for data using the set of encrypted links; and
wherein, to forward the response message, the proxy server is configured to receive the response message using the set of encrypted links.

10. The method of claim 1, wherein the proxy server comprises a secure sockets layer (SSL) proxy server or a transport layer security (TLS) proxy server.

11. The method of claim 1,
wherein the data server comprises a hypertext transfer protocol (HTTP) proxy server compliant with HTTP; and
wherein the set of header fields comprise a set of HTTP header fields compliant with HTTP.

12. A network device implementing a Software-Defined Networking (SDN) controller, the network device comprising:
a memory; and
one or more processors in communication with the memory, the one or more processors configured to:
configure a proxy server to forward a request for data from a client device to a data server and to forward, from the data server to the client device, a response message that is responsive to the request for data, wherein a set of header fields of the request for data indicates matching data and wherein the data server is configured to copy the matching data indicated in the set of header fields of the request for data into a set of header fields for the response message;
receive, from the proxy server, an indication of the set of header fields for the response message that indicates a first time specifying when the data server received the request for data, a second time specifying when the response message was sent by the data server, and an indication of the matching data copied by the data server from the set of header fields of the request for data;
identify that the response message is responsive to the request for data in response to determining that the matching data of the set of header fields for the response message matches the matching data of the header fields of the request for data; and
in response to the identifying that the response message is responsive to the request for data, generate a metric for a performance of the data server based on the first time and the second time, wherein, to generate the metric, the one or more processors are configured to generate, based on a difference between the first time indicated by the indication of the set of header fields received from the proxy server and the second time indicated by the indication of the set of header fields received from the proxy server, a server processing time for the data server to generate the response message to comprise a payload generated by the data server that is responsive to the request for data.

13. The network device of claim 12, wherein the request is a first request, the data server is a first data server, and the response message is a first response message and wherein the one or more processors are further configured to:
select a second data server from a plurality of servers comprising the first data server based on the metric for the performance of the first data server; and
configure the proxy server to forward a second request for data from the client device to the second data server and to forward, from the second data server to the client device, a second response message that is responsive to the first request for data.

14. The network device of claim 12,
wherein, to receive the indication of the set of header fields for the response message, the one or more processors are further configured to receive an indication of an initiating time specifying when the client device sent the request for data; and
wherein, to generate the metric for the performance of the data server, the one or more processors are configured to generate the metric for the performance of the data server further based on the initiating time.

15. The network device of claim 14, wherein, to generate the metric, the one or more processors are configured to generate a forward jitter value for the data server based on the initiating time and the first time.

16. A non-transitory computer-readable medium comprising instructions for causing one or more processors of a Software-Defined Networking (SDN) controller to:
configure a proxy server to forward a request for data from a client device to a data server and to forward, from the data server to the client device, a response message that is responsive to the request for data, wherein a set of header fields of the request for data indicates matching data and wherein the data server is configured to copy the matching data indicated in the set of header fields of the request for data into a set of header fields for the response message;
receive, from the proxy server, an indication of the set of header fields for the response message that indicates a first time specifying when the data server received the request for data, a second time specifying when the response message was sent by the data server, and an indication of the matching data copied by the data server from the set of header fields of the request for data;
identify that the response message is responsive to the request for data in response to determining that the matching data of the set of header fields for the response message matches the matching data of the header fields of the request for data; and
in response to the identifying that the response message is responsive to the request for data, generate a metric for a performance of the data server based on the first time and the second time, wherein, to generate the metric, the instructions cause the one or more processors to generate, based on a difference between the first time indicated by the indication of the set of header fields received from the proxy server and the second time indicated by the indication of the set of header fields received from the proxy server, a server processing time for the data server to generate the response message to comprise a payload generated by the data server that is responsive to the request for data.

* * * * *